(12) United States Patent
Mola et al.

(10) Patent No.: US 9,261,142 B2
(45) Date of Patent: Feb. 16, 2016

(54) FLANGED RADIAL BEARING WITH ROLLING BODIES

(71) Applicants: Roberto Mola, Turin (IT); Riccardo Restivo, Turin (IT); Gianpiero Scaltriti, Turin (IT)

(72) Inventors: Roberto Mola, Turin (IT); Riccardo Restivo, Turin (IT); Gianpiero Scaltriti, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/479,785

(22) Filed: Sep. 8, 2014

(65) Prior Publication Data

US 2015/0267751 A1    Sep. 24, 2015

(30) Foreign Application Priority Data

Sep. 6, 2013   (IT) .............................. TO2013A0719

(51) Int. Cl.

| F16C 33/58 | (2006.01) |
|---|---|
| F16C 19/24 | (2006.01) |
| F16C 35/077 | (2006.01) |
| F16C 35/04 | (2006.01) |
| F16C 33/60 | (2006.01) |
| F16C 19/06 | (2006.01) |

(52) U.S. Cl.
CPC ............. *F16C 33/586* (2013.01); *F16C 33/605* (2013.01); *F16C 35/045* (2013.01); *F16C 35/077* (2013.01); *F16C 19/06* (2013.01)

(58) Field of Classification Search
CPC ........ F16C 19/06; F16C 33/58; F16C 33/605; F16C 35/077; Y10T 29/49696

USPC ......... 384/494, 515, 564, 585, 588, 622, 903, 384/440, 519
See application file for complete search history.

(56) References Cited

U.S. PATENT DOCUMENTS

| 2,676,853 | A | * | 4/1954 | Shafer ........................... 384/207 |
|---|---|---|---|---|
| 2,695,203 | A | * | 11/1954 | Andersen ...................... 384/495 |
| 2,731,310 | A | * | 1/1956 | Potter ........................... 384/475 |
| 2,733,648 | A | * | 2/1956 | Todd .............................. 172/599 |
| 3,141,710 | A | * | 7/1964 | Lehman ......................... 384/477 |
| 3,506,317 | A | * | 4/1970 | De Angeli ..................... 384/542 |
| 3,767,279 | A | * | 10/1973 | Hallerback ................... 384/539 |
| 4,054,335 | A |   | 10/1977 | Timmer |
| 4,125,298 | A | * | 11/1978 | Heurich et al. ............... 384/537 |
| 4,580,757 | A |   | 4/1986 | Dobhan et al. |
| 4,993,850 | A | * | 2/1991 | Howse .......................... 384/477 |
| 5,911,515 | A | * | 6/1999 | Allen et al. ................... 384/495 |

(Continued)

FOREIGN PATENT DOCUMENTS

| DE | 2161981 A1 * | 7/1972 | ............. F16C 33/76 |
|---|---|---|---|
| DE | 2460448 A1 * | 6/1976 | ............. B60B 35/18 |

(Continued)

*Primary Examiner* — Marcus Charles
(74) *Attorney, Agent, or Firm* — Bryan Peckjian; SKF USA Inc. Patent Dept.

(57) ABSTRACT

A flanged radial bearing having rolling bodies, the bearing being provided with an outer ring radially bounded by an outer surface; an inner ring mounted coaxially inside the outer ring; a row of rolling bodies arranged between the two rings that allows relative rotation between the two rings; and a flange joined to the outer ring and mounted along an assembly groove formed through the outer surface; the flange not being a flange integral with the outer ring, but being releasably assembled on the outer ring.

13 Claims, 2 Drawing Sheets

(56) References Cited

U.S. PATENT DOCUMENTS

| | | | |
|---|---|---|---|
| 6,505,973 B2 * | 1/2003 | Buchheim et al. | 384/537 |
| 6,517,757 B1 | 2/2003 | Anneken et al. | |
| 6,652,150 B2 * | 11/2003 | Buchheim et al. | 384/537 |
| 8,393,796 B2 * | 3/2013 | Cressman | 384/558 |
| 8,668,392 B2 * | 3/2014 | Maldera | 384/542 |
| 2011/0211782 A1 * | 9/2011 | Beyfuss et al. | 384/428 |

FOREIGN PATENT DOCUMENTS

| | | | | |
|---|---|---|---|---|
| DE | 102004053078 A1 * | 5/2006 | | |
| FR | 2209424 A5 * | 6/1974 | | F16C 35/06 |
| JP | 61189150 A * | 8/1986 | | H02K 11/00 |
| JP | 2000170780 A * | 6/2000 | | F16C 35/07 |
| JP | 2001132741 A * | 5/2001 | | F16C 19/18 |
| JP | 2007309419 A * | 11/2007 | | F16C 33/76 |

* cited by examiner

FLANGED RADIAL BEARING WITH ROLLING BODIES

CROSS-REFERENCE TO RELATED APPLICATIONS

This application claims the benefit of priority to Italian Application No. TO2013A000719 filed Sep. 6, 2013, which is herein fully incorporated by reference.

FIELD OF THE INVENTION

The present invention relates to a flanged radial bearing comprising rolling bodies.

BACKGROUND OF THE INVENTION

Flanged radial bearings of the rolling body type, comprising an outer ring and an inner ring coaxial with each other, a row of rolling bodies arranged between the two rings so as to allow relative rotation of the two rings, and a flange, which is joined to the outer ring and is formed as one piece with and made of the same material as the outer ring, are known.

Since the flange described above is integral with the outer ring, the use, or rather, the flexibility of use of the bearing is limited as a result since certain different applications could require flanges with different characteristics in terms of shape and materials, but outer and inner rings with the same performance and technical characteristics.

Therefore, although it is possible to use a same bearing (understand as meaning a set of rings and rolling bodies) in several applications requiring, however, different flanges, it is necessary to equip the bearing production channels in such a way that they can produce at least the outer ring and the flange depending on the type of application.

Such a modus operandi is not compatible with the ever increasing demands for standardization of the greater number of components, savings in production, and flexibility of the products and the associated production channels.

SUMMARY OF THE INVENTION

The object of the present invention is to provide a flanged radial bearing comprising rolling bodies, which bearing is extremely versatile in terms of its use, thereby overcoming the drawbacks described above.

According to the present invention a flanged radial bearing comprising rolling bodies, with the characteristic features described in the accompanying claims, is provided.

BRIEF DESCRIPTION OF THE DRAWINGS

The invention will now be described with reference to the accompanying drawings which illustrate a non-limiting example of embodiment thereof, in which.

DETAILED DESCRIPTION OF THE INVENTION

Figure 1:
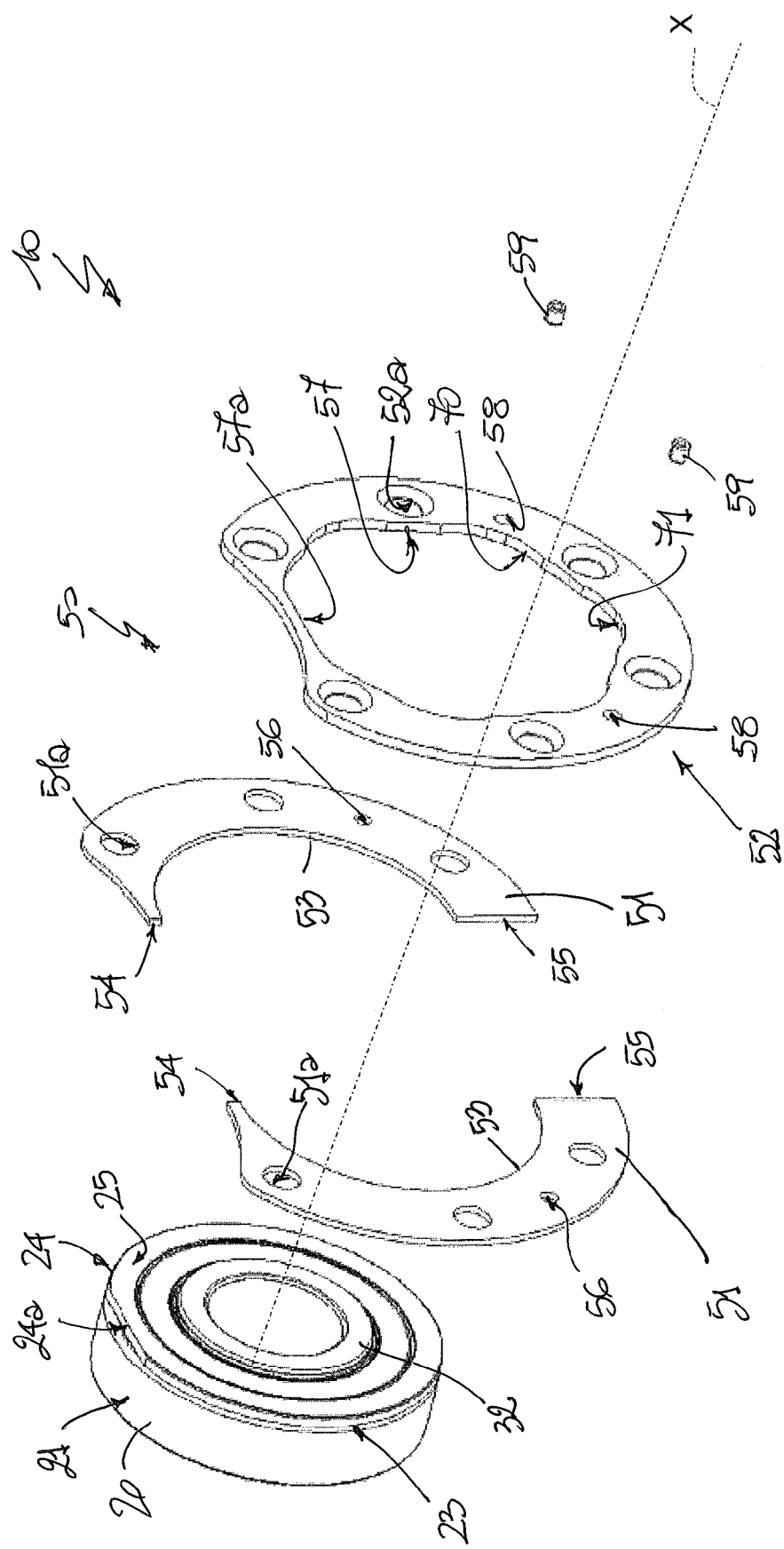
FIG. 1 is an exploded perspective view of a preferred embodiment of the flanged radial bearing comprising rolling bodies according to the present invention.
Figure 3:
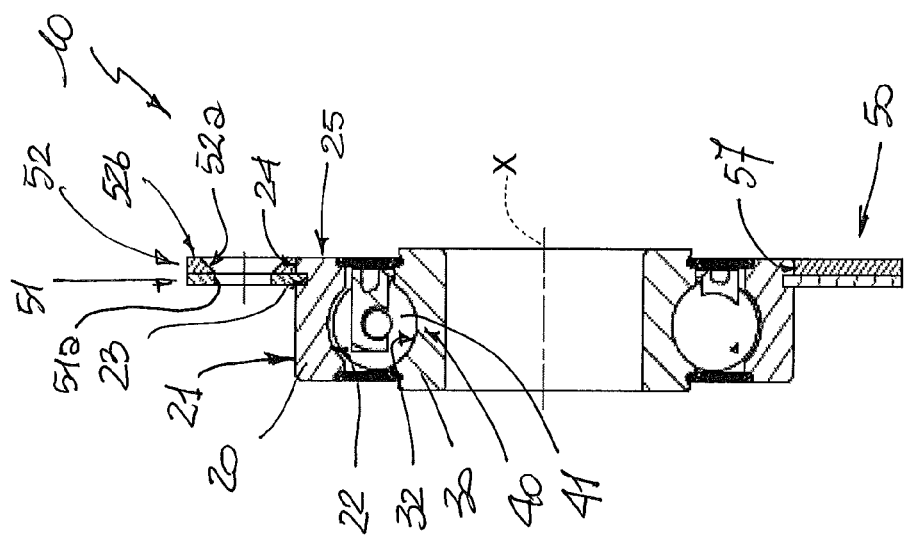
FIG. 3 is a cross-section along the line III-III of FIG. 2.

With reference to FIGS. 1 and 3, 10 denotes in its entirety a flanged radial bearing comprising rolling bodies 41, in particular balls.

The bearing 10 has an axis X of rotation and comprises:
an outer ring 20 radially bounded by an outer surface 21 and provided with an inner raceway 22;
an inner ring 30 mounted coaxially inside the outer ring 20 and provided with an outer raceway 32;
a row 40 of rolling bodies 41 arranged inside the raceways 22 and 32 so as to allow relative rotation of the two rings 20 and 30.

For the purposes of assembly of the bearing 10 with external mechanical components, for example for the purposes of assembly of the bearing 10 on a gearbox housing, the bearing 10 comprises, moreover, along an assembly groove 23 which is formed in the outer ring 20 through the outer surface 21 and defines, on the outer surface 21, an annular mounting edge 24. The annular edge 24 has an axial dimension substantially the same as, but not smaller than an axial dimension of the groove 23 and is axially bounded, on an axially inner side of the outer ring 20, by the groove 23 and, on an axially outer side of the outer ring 20, by a front surface 25 of the outer ring 20, transverse to the axis X.

Since the flange 50, as we shall see more clearly in the present description below, is assembled in such a manner that it may be disassembled from the outer ring 20, it is possible to use the same outer ring 20, together with the associated inner ring 30, for different applications which require flanges 50 with different dimensions simply by assembling on the outer ring 20 the flange 50 which is most suitable for the type of application. In other words, the channel for production of the bearing 10 may remain the same, independently of the type of application of the bearing 10, and it will be sufficient at the end of the process to assemble on the bearing 10 a flange 50 specific for the type of application. This results not only in evident cost-related savings, but also in streamlining of the production procedures, as well as greater standardization of production itself.

The flange 50 comprises:
two semi-annular plates 51 with a half-moon shape which are independent of each other and are partially inserted inside the assembly groove 23 in order to secure the flange 50 to the outer ring 20, and
an annular plate 52 arranged axially against the two semi-annular plates 51 so as to lock the semi-annular plates 51 inside the assembly groove 23.

The two semi-annular plates 51 are arranged on opposite sides of the axis X and the outer ring 20, have the same shape and are provided with respective radially inner edges 53 which are inserted inside the assembly groove 23. Each semi-annular plate 51 has an axial thickness with dimensions the same as an axial thickness of the assembly groove 23 and is provided with a respective pair of terminal bearing surfaces 54 and 55: the terminal bearing surfaces 54 and 55 of each semi-annular plate 51 are arranged along a same diametral plane transverse to the surface 25 and are facing and in contact with the terminal bearing surfaces 54 and 55 of the other semi-annular plate 51, ensuring in this way stable assembly of the two semi-annular plates 51 inside the groove 23.

In particular, the edges 53 of each semi-annular plate 51 are inserted inside the groove 23, preventing in fact any axial movement of the two semi-annular plates 51, and the terminal surfaces 54 and 55, being arranged at the opposite ends of the associated semi-annular plate 51 and being arranged in contact with the terminal surfaces 54 and 55 of the other plate, prevent any relative circumferential movement of a semi-annular plate 51 with respect to the other semi-annular plate 51. The edges 53, as well as a bottom surface of the groove 23, have a cylindrical form and allow the semi-annular plates 51 to rotate, but together, about the axis X allowing any adjustment in the position of the semi-annular plates 51 during assembly.

Each semi-annular plate 51 is provided, moreover, with a respective through-hole 56 arranged in a substantially intermediate position between the terminals surfaces 54 and 55, preferably in a position closer to the respective surfaces 55.

The annular plate 52 is provided with a central through-hole 57 and is keyed onto the outer surface 21 of the outer ring 20, or more specifically, is keyed onto the edge 24 in a position axially against the two semi-annular plates 51 and is further provided, for each semi-annular plate 51, with a respective through-hole 58 formed opposite the associated hole 56. Each hole 58 is engaged by a respective elastic pin 59 which is inserted inside both the hole 58 and the associated hole 56 so as to fasten the annular plate 52 to both the semi-annular plates 51 and prevent accidental disassembly of the semi-annular plates 51 from the groove 23.

In the example of embodiment shown in FIG. 1, the central through-hole 57 has, preferably but not necessarily, a plurality of cylindrical sections 70 distributed around the axis X and spaced by recessed zones 71 which serve not only to lighten the plate 52, but are also useful when the plate 52 must be disengaged, if necessary, from the edge 24 since they reduce the friction, or the force required for removal, and, obviously, assembly, of the plate 52 itself.

In particular, each elastic pin 59, being inserted inside the holes 56 and 58, is compressed radially, exerting, once inserted, an expansive elastic reaction against the walls of the holes 56 and 58 and therefore preventing any axial relative movement of the semi-annular plates 51 and the plate 52. Moreover, each pin 59 acts, in relation to the respective semi-annular plate 21, as the fulcrum of a first-degree lever, at the ends of which the terminal surfaces 54 and 55 are arranged: since the terminal surfaces 54 of a semi-annular plate 51 are arranged against the terminal surfaces 54 of the other semi-annular plate 51, and likewise the terminal surfaces 55 of a semi-annular plate 51 are arranged against the terminal surfaces 55 of the other semi-annular plate 51, there is no possibility of rotation of the semi-annular plates 51 either with respect to the associated pin or with respect to each other. In other words, once the edges 53 of the semi-annular plates 51 are inserted inside the groove 23 and the pins 59 are inserted inside the holes 56 and 58, there is no longer the possibility of any axial movement either of the semi-annular plates 51 or of the annular plate 52.

Figure 2:
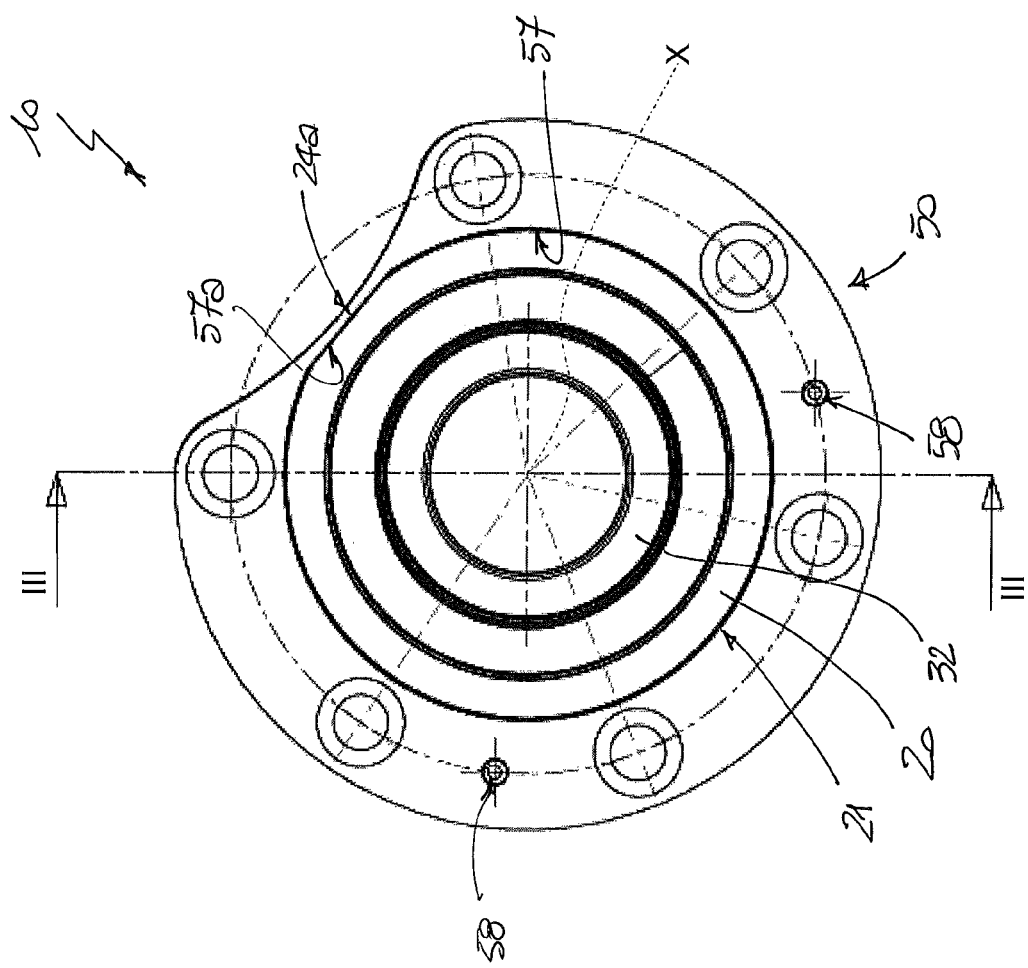
FIG. 2 is a front perspective view of the bearing shown in FIG. 1.

Moreover, both the edge 24 and the hole 57, which, in FIG. 2, is by way of alternative shown with a cylindrical shape, are provided with respective anti-rotational flat zones 24a and 57a which are engaged together so as to prevent rotation of the annular plate 52 with respect to the outer ring 20, namely, prevent rotation also of the semi-annular plates 51 with respect to the outer ring 20.

In other words, owing to the engagement of the two semi-annular plates 51 inside the grove 23, upon locking of the two semi-annular plates 51 together with the annular plate 52 by means of the pins 59 and upon mutual engagement of the two flat zones 24a and 57a, the flange 50 is fully locked on the outer ring 20, not having any degree of freedom either along the axis X or about the axis X.

For the purposes of assembly of the bearing 10 with the external mechanical components, as also shown in FIG. 2, both the semi-annular plates 51 and the annular plate 52 are provided with respective through-holes 51a and 52a, where the through-holes 51a of the semi-annular plates 51 are aligned with the through-holes 52a of the annular plate 52. The holes 51a and 52a are uniformly distributed around the axis X and the overall number of holes 51a and 52a varies with a variation in the type of application: in the example of embodiment shown in the accompanying figures, by way of example, each semi-annular plate 51 is provided with three holes 51a and the plate 52 is provided with six holes 52a.

The annular plate 52 has an axial thickness with dimensions the same as the axial dimensions of the edge 24 so that, once arranged against the two semi-annular plates 51, a free side 52b thereof, namely its side opposite to that arranged against the two semi-annular plates 51, is arranged in a position coplanar with the front surface 25 of the outer ring 20.

As regards the constructional materials of both the semi-annular plates 51 and the annular plate 52, these may be freely chosen irrespective of the steel for the bearings from which the outer ring 20 and inner ring 30 may be made. In particular, both metallic materials and plastic materials or combinations thereof, depending on the mechanical stresses which the flange 50 and the bearing 10 must withstand, may be chosen.

From the above it is clear that the use of a flange 50 of the type suitable for assembly, such as that described, significantly broadens the use of the bearing 10 and allows production of the rings 20 and 30 to be standardized, irrespective of the end use of the bearing 10 with significant savings in terms of production time and costs.

It is understood that the invention is not limited to the embodiment described and illustrated here which is to be regarded as an example of embodiment of the flanged radial bearing comprising rolling bodies, the bearing instead being subject to further modifications with regard to the form and arrangement of parts as well as the constructional and assembly details.

Alternatively, in fact, depending on specific requirements of both a technical and cost-related nature, the pins 59, and consequently the holes 56 and 58, may be threaded or advantageously replaced by welding points either located in the same position as the holes 56 and 58, or distributed along the semi-annular plates 51 and the annular plate 52. In this case, the semi-annular plates 51 and the annular plate 52 must be made of metallic material.

The axial dimensions of the semi-annular plates 51 and the annular plate 52 which, in the present embodiment are substantially similar, may also be varied depending on the uses of the flanged bearing 10 described above. As already underlined, the possibility of assembling the flange 50 on the outer ring 20 and the particular technical design of the flange 50 itself are such that a wide range of configurations of the bearing 10 are possible.

The invention claimed is:

1. A flanged radial bearing having rolling bodies, the bearing comprising:
   an outer ring radially bounded by an outer surface;
   an inner ring mounted coaxially inside the outer ring;
   a row of rolling bodies arranged between the inner ring and the outer ring that allows relative rotation between the inner ring and the outer ring; and
   a flange joined to the outer ring; wherein
   the outer ring is provided with an assembly groove formed through the outer surface; and
   wherein
   the flange is not integral with the outer ring, but is releasably assembled on the outer ring along the assembly groove, and wherein the flange is secured to the outer ring via at least one pin that is inserted axially into the flange.

2. The flanged bearing according to claim 1, wherein the flange is partially inserted inside the assembly groove to secure the flange to the outer ring, and a first portion of the flange engages the assembly groove, and a second portion of the flange overlies an entire axial end of the first portion that is not inserted inside the assembly groove to releasably secure the first portion of the flange to the assembly groove.

3. The flanged bearing according to claim 2, wherein the first portion of the flange comprises two semi-annular plates engaged with the assembly groove.

4. The flanged bearing according to claim 3, wherein the second portion of the flange comprises an annular plate provided with a central through-hole and keyed onto the outer surface of the outer ring, the annular plate being arranged axially against the two semi-annular plates and being fastened to both the semi-annular plates.

5. A flanged radial bearing having rolling bodies, the bearing comprising:
 an outer ring radially bounded by an outer surface;
 an inner ring mounted coaxially inside the outer ring;
 a row of rolling bodies arranged between the outer ring and the inner ring that allows relative rotation between the outer ring and the inner ring; and
 a flange joined to the outer ring; wherein
 the outer ring is provided with an assembly groove formed through the outer surface;
 wherein
 the flange is not integral with the outer ring, but is releasably assembled on the outer ring along the assembly groove, wherein the flange provides securing means partially inserted inside the assembly groove to secure the flange to the outer ring, and locking means arranged axially against the securing means to lock the securing means inside the assembly groove, and wherein the securing means includes two semi-annular plates separate from each other and provided with respective radially inner edges inserted inside the assembly groove.

6. The flanged bearing according to claim 5, wherein the locking means includes an annular plate provided with a central through-hole and keyed onto the outer surface of the outer ring, the annular plate being arranged axially against the two semi-annular plates and being fastened to both the semi-annular plates.

7. The flanged bearing according to claim 6, wherein the locking means includes, for each semi-annular plate, at least one pin inserted through the corresponding semi-annular plate and the annular plate to fasten together the semi-annular plate and the annular plate.

8. The flanged bearing according to claim 7, wherein the assembly groove defines, on the outer surface of the outer ring, an annular mounting edge onto which the annular plate is keyed, the annular mounting edge and the through-hole of the annular plate being provided with respective anti-rotational flat zones engaging together so as to prevent rotation of the annular plate with respect to the outer ring.

9. The flanged bearing according to claim 7, wherein each semi-annular plate is provided with a respective pair of terminal bearing surfaces, the terminal bearing surfaces of each semi-annular plate facing each other and making contact with the terminal bearing surfaces of the other semi-annular plate and being arranged on opposite sides of the associated pin.

10. The flanged bearing according to claim 9, wherein the semi-annular plates and the annular plate are provided with respective through-holes (51a, 52a), the through-holes (51a) of the semi-annular plates (51) being axially aligned with the through-holes (52a) of the annular plate (52).

11. A flanged radial bearing having rolling bodies, the bearing comprising:
 an outer ring radially bounded by an outer surface;
 an inner ring mounted coaxially inside the outer ring;
 a row of rolling bodies arranged between the inner ring and the outer ring that allows relative rotation between the inner ring and the outer ring; and
 a flange joined to the outer ring; wherein
 the outer ring is provided with an assembly groove formed through the outer surface;
 wherein
 the flange comprises first and second portions, the first portion being configured to engage the assembly groove, the second portion being configured to overlie an entire axial end of the first portion that is not inserted into the assembly groove, the second portion having an axial end that is coplanar with an outer ring axial end; and wherein
 the flange is not integral with the outer ring, but is releasably assembled on the outer ring along the assembly groove.

12. The flanged bearing according to claim 11, wherein the first portion comprises two semi-annular plates engaged with the assembly groove.

13. The flanged bearing according to claim 12, wherein the second portion of the flange comprises an annular plate provided with a central through-hole and keyed onto the outer surface of the outer ring, the annular plate being arranged axially against the two semi-annular plates and being fastened to the two semi-annular plates.

\* \* \* \* \*